UNITED STATES PATENT OFFICE.

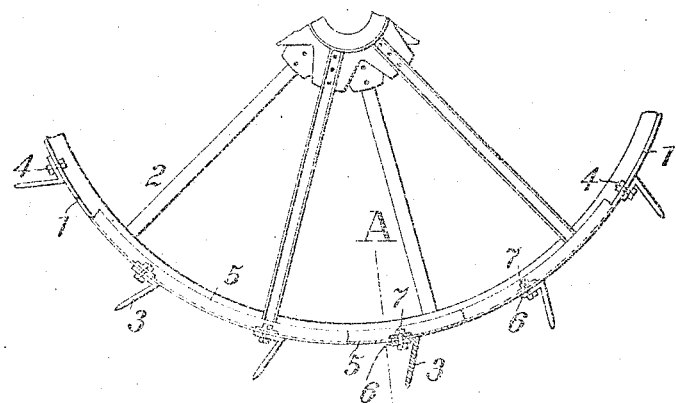
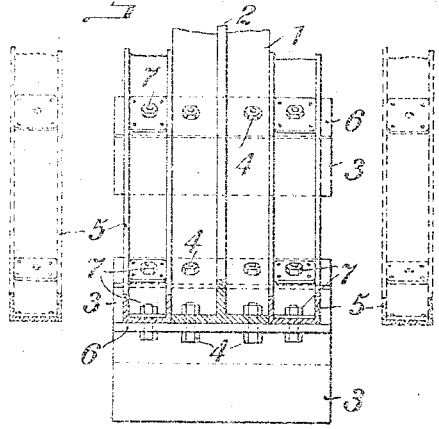
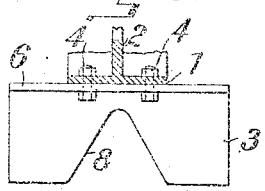

CARL GLEICHE, OF BERLIN, GERMANY, ASSIGNOR TO STOCK MOTORPFLUG GESELLSCHAFT MIT BESCHRANKTER HAFTUNG, OF BERLIN, GERMANY, A CORPORATION OF GERMANY.

WHEEL FOR MOTOR-PLOWS AND THE LIKE.

1,287,670.

Specification of Letters Patent. Patented Dec. 17, 1918.

Application filed August 4, 1914. Serial No. 854,931.

*To all whom it may concern:*

Be it known that I, CARL GLEICHE, a citizen of the German Empire, and resident of Berlin, Germany, have invented certain new and useful Improvements in Wheels for Motor-Plows and the like, of which the following is a specification.

My invention relates to road wheels for motor plows and the like of the kind in which the tread is provided with projecting ribs, grippers or the like and is of variable width to enable such road wheels to travel on marshy or insecure ground.

In the accompanying drawing which shows one construction of wheel according to my invention, by way of example, Figure 1 is an elevation, partly in section, of the bottom portion of a road wheel. Fig. 2 is a section on the line A—B of Fig. 1, on an enlarged scale, and Fig. 3 shows a modified construction of the ribs or grippers used for the road wheel.

The rim 1 of the road wheel 2 is provided on its tread in the well known manner with grippers 3 arranged at a distance behind each other and suitably connected to the rim 1, for instance, by means of bolts 4. The grippers 3 project laterally to a considerable extent beyond the rim 1, which results in the grippers meeting the greatest possible resistance on engaging with the ground.

According to my invention, the portions of the grippers 3, which project laterally beyond the rim 1, are utilized for detachably securing the tread rings 5 used for widening the contact surfaces or tread of the rim 1. To that end, the rings 5 which are preferably formed of U-shape in cross-section, are connected by means of bolts 7 to the upper or peripheral supporting portions 6 of the grippers, which are bent at an angle without any further connection of the rings 5 to the rim 1 being required. This connection of the tread rings 5 to the lateral portions of the grippers 3 can be very easily effected by placing the rings (Fig. 2) at the side, as the parts to be connected together are exposed at the outside and in that way the securing members can be easily attached or removed. Moreover, owing to this method of connection, an appreciable strengthening of the grippers 3 projecting beyond the rim 1, is insured, whereby any changes in the shape of the grippers and the consequent disadvantage as regards their action, are avoided.

According to the extent to which the tread of the road wheel is to be widened, the latter can be connected in a readily detachable manner on one or both sides to narrower or wider rings, and in that way easily adapted to the existing conditions of the ground.

In traveling on clayey or very adhesive soil, there is the drawback that the angular spaces inclosed by the central portion of the grippers 3 and the adjoining portions of the rim 1, are more or less filled with soil which adheres thereto when the grippers leave the ground. The consequence is that the central portion of the grippers becomes more or less ineffective as regards the driving of the wheel, and in that way the grippers cannot fulfil their object to an adequate extent.

In such cases, I find it advisable to use grippers which, as shown in Fig. 3 of the drawing, are provided with a recess 8 breaking the cutting edge of the gripper 3 in the middle and preferably widening from the inside outward in a V-shape, though it will be understood that the shape of the recess may be varied if desired. This recess 8 prevents the adhesion of soil in the angular spaces between the grippers and the rim, or reduces it to an extent which is quite negligible in practice.

I claim:

1. A road-wheel for motor plows and the like, provided with a rim forming a tread surface, grippers secured to said rim and projecting both outwardly and beyond said tread surface, and tread-widening rings secured detachably to the lateral projections of said grippers, and adapted to increase the width of said tread surface.

2. A road-wheel for motor-plows and the like, provided with a rim forming a tread surface, grippers secured to said rim and projecting therefrom laterally at intervals, the spaces between adjacent grippers being of considerably greater circumferential extent than the grippers themselves, whereby the grippers may enter the soil to such a degree as to cause the outer surface of the rim to form the tread surface, a detachable rim-widening ring adapted to be placed in contact with the laterally-projecting portions of said grippers, and means for securing said ring to said projecting gripper portions.

3. A road-wheel for motor-plows and the like, provided with a rim forming a tread surface, grippers secured to the rim at intervals and projecting therefrom laterally, rings in edge contact with the edges of said rim and having their outer surfaces flush with the outer rim surface and in engagement with the inner surfaces of the projecting gripper portions, and means for securing said rings detachably to the projecting gripper portions.

4. A road-wheel for motor-plows and the like, provided with a rim forming a tread surface, grippers secured to said rim at intervals and projecting therefrom laterally, and rings, in edge contact with the edges of said rim, secured detachably to the laterally projecting portions of said grippers to widen the tread surface.

In testimony whereof, I have signed this specification in the presence of two subscribing witnesses.

CARL GLEICHE.

Witnesses:
HERMANN PERINI,
FRANZ ZOMMULLER.

Copies of this patent may be obtained for five cents each, by addressing the "Commissioner of Patents, Washington, D. C."